Patented Oct. 7, 1930

1,777,998

UNITED STATES PATENT OFFICE

HARRY M. DENT, OF BUFFALO, AND FRANK W. LESS, OF NORTH TONAWANDA, NEW YORK, ASSIGNORS TO GENERAL PLASTICS, INC., A CORPORATION OF NEW YORK

CORE FOR METALLIC CASTINGS AND METHOD OF MAKING THE SAME

No Drawing.   Application filed May 22, 1929. Serial No. 365,231.

In the manufacture of cores for use in making metal castings, it is customary to mix sand with a binder, shape the core and then bake it. A vast number of materials have been suggested and tried as the binder in this process, but all of them are subject to various defects or disadvantages.

We have discovered that cores of very excellent quality can be made by using a binding agent which comprises a synthetic resin of the heat-hardening type such as a potentially reactive phenolic resin. The binder may include varying percentages of other ingredients such as ordinary rosin or colophony, which blends with the synthetic resin and increases its fluidity when first heated.

In making cores according to our process, the resinous material may be combined with the sand by grinding it to a powder and mixing it with the sand which is dampened either before or after such mixing. We prefer, however, to incorporate the resinous material in the form of a dispersion in water which will both dampen the sand and give a very thorough permeation of the resinous material.

In carrying out our invention in accordance with the preferred embodiment thereof, proper ingredients such as phenol and formaldehyde are caused to react in the presence of preferably an alkali catalyst to form a resinous material. Such resinous material can be dispersed in an ordinary colloid mill at any stage in the reaction while it still remains thermoplastic, but we prefer to form the dispersion in the early stages of the reaction while the resinous material is still in substantially liquid state. In making the dispersion the usual procedure is followed and various dispersing agents may be used, but we have found that the most satisfactory for this purpose are gum ghatti or gum arabic. A rosin soap may be used but in general the metallic soaps will not give a stable dispersion though they can be used if the dispersed material is to be employed promptly. If additional material such as rosin or oily matter is to be incorporated with the synthetic resin, such material can be added directly in the colloid mill.

The amount of water to be incorporated in the emulsion may vary within wide limits, depending somewhat upon the amount of water to be used in making the core. If the water content of the dispersion is not too high, the sand may first be moistened before the dispersion is added to it.

The sand, either dry or first moistened, is thoroughly mixed with the dispersed material. The core is then formed to shape and baked. In general it will be found that the baking time necessary is greatly reduced over that which has been commonly the practice, and this is true whether the resinous material is added dry or in the form of a dispersion; for example, where a usual form of core compound containing linseed oil and rosin requires two and one-half hours baking for a certain size of core, only about one-half hour is required with our compound, which is rigid while hot, due to the fact that the resinous material, having been dispersed, thoroughly coats each grain and during the baking the synthetic resin is converted to the infusible state. During the baking a slightly higher kiln temperature may be used than with the linseed oil type of core compound and it will be found that during this operation the smoke or fumes given off are very much less objectionable than those arising from linseed oil.

Our invention can readily be understood from the following specific examples:

The usual phenolic resin was made by reacting on phenol with formaldehyde using barium oxide as a catalyst. As soon as the reaction products showed the formation of resin by a tendency towards a layer separation, the mass was put in a colloid mill together with colophony and a small amount of gum arabic was included as a dispersing agent. The proportions used were a total of three gallons of water for each eight pounds of synthetic resin and four pounds of colophony. The rosin may be melted before being introduced into the colloid mill or may be introduced solid provided the water is warm enough to soften it. On running the ingredients through the colloid mill, a milky liquid was obtained. This liquid was mixed with molding sand (containing between 3 and 5% of moisture) in the proportions of 40 parts by volume of sand to one part by volume of the emulsion. Such proportions may be varied over quite wide limits, as for example between 25 and 80 parts by volume of sand may be used to one part of the emulsion. The sand was molded into relatively small cores and then introduced into an oven where the oven temperature was between 350° and 400° F., though the actual temperature of the cores probably was somewhat lower due to their moisture content. The baking was continued for half an hour. The resulting cores were then used in making iron castings. They had adequate strength and it was found that they readily decomposed under the action of the heat of the metal so that they were removed with great ease. It was also found that the carbonization had gone on to such a point that the sand could be freely re-used for manufacture of subsequent cores instead of being worthless for this purpose as is ordinarily true with the linseed oil type of core.

It is to be understood that the specific proportions stated are given only by way of example and may be modified in many particulars. For example, if a particularly strong product is desired, the colophony may be omitted and larger amounts of resin may be used. It is also to be understood that other synthetic resins of the heat-hardening type such as urea resins can be used instead of a phenolic resin. Our process, with proper modification of proportions, may also be used for aggregating other granular material, as for example in the manufacture of abrasive wheels.

What we claim is:

1. The process of forming aggregates of granular material which comprises the steps of forming a dispersion comprising a synthetic resin of the heat-hardening type, wetting the granular material with such dispersion, shaping the mass and thereafter heating to harden the synthetic resin.

2. In the art of making cores, the steps of forming a dispersion comprising a potentially reactive phenolic resin and colophony, mixing such dispersion with sand, shaping, and thereafter heating to drive out water from the mass and to cause the phenolic resin to continue its reaction.

3. A liquid adapted for use in making cores, comprising a dispersion in water of a synthetic resin of the heat-hardening type and of rosin.

4. A core for use in making metal castings comprising sand and a binder comprising a synthetic resin hardened by heat, which is characterized by the completeness with which such binder is carbonized by the heat derived from metal cast about such core, so that the sand may be adaptable for re-use in making cores.

5. A core for use in making metal castings, comprising a highly porous body of sand bound together with a binder comprising a synthetic resin of the phenolic type.

FRANK W. LESS.
HARRY M. DENT.